United States Patent Office 2,968,731
Patented Jan. 17, 1961

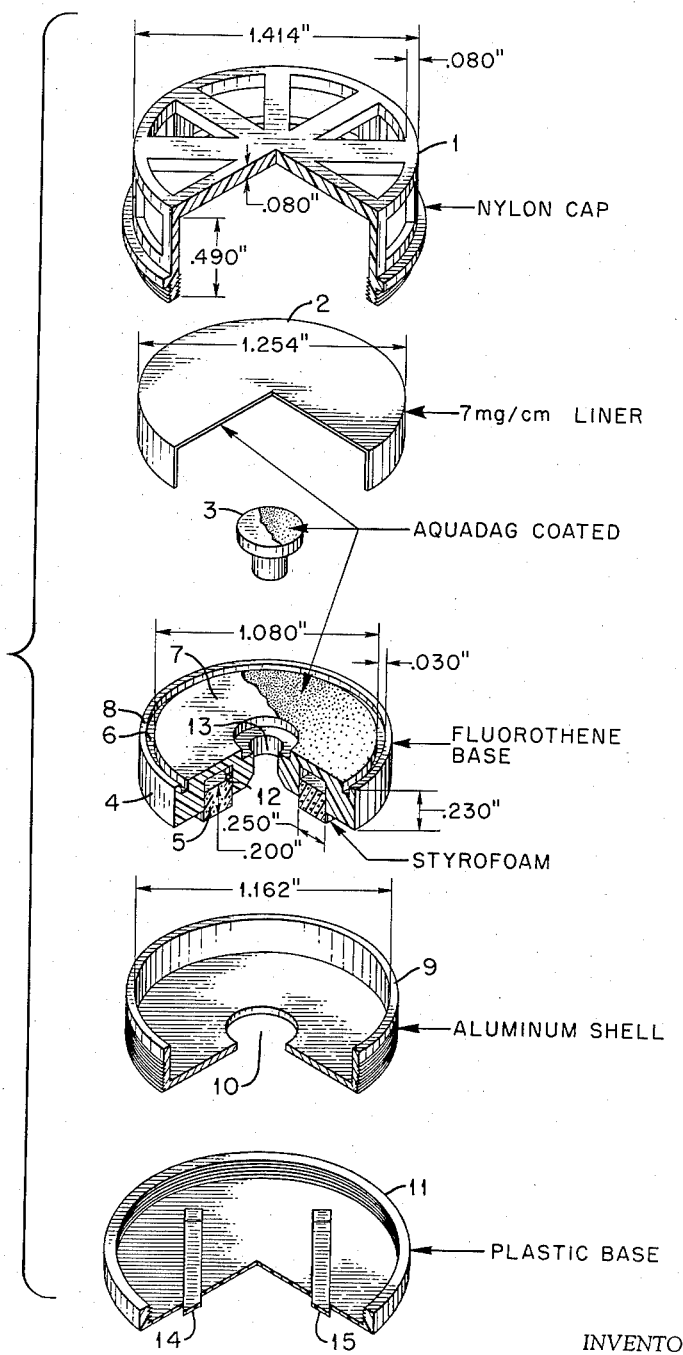

2,968,731

BETA-GAMMA PERSONNEL DOSIMETER

Doyle M. Davis, Corryton, Edwin D. Gupton, Oak Ridge, and James C. Hart, Lenoir City, Tenn., and Andrew P. Hull, Kingston, N.J., assignors to the United States of America as represented by the United States Atomic Energy Commission Filed July 1, 1959, Ser. No. 824,442

5 Claims. (Cl. 250—83.6)

This invention relates to personnel dosimeters, and more especially to a novel personnel dosimeter which is sensitive to both hard and soft gamma and beta radiations within a $2\pi$ solid angle.

The dosimeter disclosed herein is an improvement over the device set forth in U.S. Patent No. 2,875,343, issued February 24, 1959. The device set forth in this patent is in the shape of a long narrow cylinder, and is not adapted to receive radiations from all directions within a hemisphere because of the "blind" areas subtended by its solid end caps and charging mechanism. The patented device is not adapted to be worn near a worker's hands, to monitor the dose received by his hands while working with radioactive materials. If the device in the above patent were worn perpendicular to (across) the wrist of a worker, it would be cumbersome and interfere with the use of his hands, and if worn parallel to the wrist, it would not indicate the entire dose received from active materials being handled.

Personnel dosimeters constructed prior to the above device and prior to the device disclosed herein will not indicate the presence of soft or low energy beta rays because their walls are so thick that they absorb the weak beta rays before they can penetrate into the sensitive volume of the chamber. Dosimeters have in the past required such thick walls because they must possess sufficient structural strength to withstand rough handling in normal use, and also because it was assumed that the walls should be sufficiently thick so that gamma rays would reach equilibrium with their secondary electrons. Consequently, workers carrying only the prior art standard pocket chambers have not had measured the possible radiation danger due to soft beta radiations.

Accordingly, it is a primary object of this invention to provide an improved personnel dosimeter or ionization chamber which is sensitive to both gamma and beta radiations from directions subtended by a $2\pi$ solid angle including the sensitive area of the device.

Another object of this invention is to provide a beta-gamma-sensitive personnel dosimeter which is rugged and strong in construction so that it may be carried on the person of one who is exposed to ionizing radiations, and particularly close to a person's hands.

A further object of the invention is to provide a true personnel dosimeter; that is, a device having a response which will approximate the dose received by the basal layer of the epidermis, taking into account the natural shielding of the outer layers of skin, in order to provide a more accurate indication of the dosage to human tissue due to both beta and gamma radiations.

Other objects and advantages of this invention will become apparent from a consideration of the following detailed description of a preferred embodiment thereof, when read in conjunction with the appended drawing which shows in the single figure a plan and a part sectional elevation view of the dosimeter.

The above objects have been accomplished in the present invention by providing a dosimeter having a parallel plate ionization chamber in the shape of a shallow pill box with an enclosing base and shell assembly enclosing the chamber. The top and sides of the shell are 50 percent open to define a void area to give 50 percent response to beta rays from all directions within a hemisphere. The ionization chamber which is exposed to the openings in the shell is surrounded with a plastic film having a surface density of 7 mg./cm.² to approximate the dead layer of the human epidermis. In this manner, any radiation that penetrates into the chamber would be such as to cause damage to skin tissue.

Refer now to the drawing which illustrates one embodiment in which the principles of this invention may be carried out. A shell 9 is provided with a flange which is externally threaded. Shell 9 is constructed from aluminum or magnesium or their alloys which contain little or no metals of atomic number higher than that of aluminum, for example. A base 4 is provided which fits inside of the flange of shell 9 and is held in place by screws, not shown. Base 4 has a central opening 13 for receiving an aluminum rivet 3 in such a manner that the top of the rivet is flush with the top surface of base 4. The base 4 is constructed from a suitable plastic, particularly one of high resistivity and low dielectric constant such as fluorothene, for example. The top of base 4 has an annular groove 6 therein which separates an outer ring 8 from an inner disc 7. Disc 7 and the top of rivet 3 are coated with colloidal graphite (Aquadag) to provide a conductive surface, and this coating forms an insulated electrode of the ionization chamber. An electrostatic charge is placed on this surface by applying a source of potential to the rivet 3. Rivet 3 is normally protected against accidental discharge by a plastic base 11 which, after assembled, covers a hole 10 in the shell 9.

The bottom side of base 4 is provided with an annular groove 12. The groove 12 is filled with a material, such as styrofoam, for example, to prevent the possibility of ions from migrating to the surfaces and causing false readings.

A cap 1, made of nylon, for example, is provided on its top and sides with 50 percent openings to give 50 percent response to beta rays compared to gamma rays from all directions within a hemisphere. The lower inside of the cap is provided with screw threads for engagement with the threads on the flange of shell 9. A plastic liner 2 is also provided which fits inside of the cap 1. The inside of liner 2 is coated with "Aquadag," or the liner 2 may be constructed from a conducting plastic. This liner is the other plate of the ionization chamber and contacts the flange of shell 9 and is grounded thereto. Liner 2 is constructed to have a surface density of 7 mg./cm.² to approximate the dead layer of the human epidermis.

The plastic base 11 is provided with an internally threaded flange and a pair of depressed wrist strap holders 14 and 15 for receiving a wrist strap, not shown. The cap 1 is provided with external screw threads on the lower end thereof. After the shell 9, base 4, and liner 2 are assembled within the cap 1, the base 11 is then threadably assembled to the cap 1.

The dosimeter has an over-all diameter of 1.5 inches, is 0.75 inch high, and is intended to be provided with a wrist strap, not shown, or it may be mounted in a holder which can be clipped by means, not shown, onto the wearer's collar, or it may be threaded for attachment to a finger ring holder. The sensitive volume of the dosimeter is 5.3 cm.³. The capacitance of the dosimeter, which is made approximately $4\mu\mu f.$, is the sum of that between the insulated electrode and the inside of the cap and between the insulated electrode and the base 11. The latter capacitance is determined by the thickness of the base 4, its dielectric constant, and by the size of the groove 12. The dosimeter can be charged and read on a conventional standard electrometer.

The outer cap 1 was made of nylon for strength, ease of moulding and response to X- and gamma-rays independent of radiation energy. The density of 7 mg./cm.² for the liner 2 was choosen because it is desirable to detect any beta-ray which can penetrate such a liner since such a penetration can damage skin tissue.

In the dosimeter described above, substantially 50 percent of the incident low energy beta radiation will pass through the openings in cap 1 and the thin inner wall 2 and enter the ionization region, so that the chamber will read the total gamma radiation dose plus at least 50 percent of the beta radiation dose. Up to about 90 percent of the high energy beta radiation will pass through the walls and openings.

In operation, the base 11 is removed and the dosimeter is charged by contacting the rivet 3 through hole 10 in shell 9 with a conventional charger. It may be charged to about 150 volts, for example. The base 11 is then replaced, a wrist strap affixed thereto, and the dosimeter is given to the person who is to carry it. At the end of the allowed working time, or as desired, the wearer returns the device to be read on a conventional dosimeter reader. The reading obtained will be equivalent to the total of the gamma radiation plus at least one-half the actual beta radiation received. If a conventional dosimeter is also carried, the total gamma dose may be obtained from it and then subtracted from the indication of the present beta-gamma dosimeter to obtain the 50 percent dose reading. If it is known that the wearer were exposed only to beta radiation, then the reading may be multiplied by two to give the total beta dose received. It will be noted that if the beta radiation energy is high, multiplying the dosimeter reading by a factor of 2 will overestimate the radiation because some radiation will penetrate the outer wall area. Use of this factor of 2 accordingly provides a safety factor built into the device for energies of different levels.

In the dosimeter described above, the electric field in the chamber must be large enough to collect all the ions formed at any reasonable dose rate. It was designed so that the minimum electric field after a 200-mr. exposure was at least 120 v./cm. The overall gamma sensitivity of the dosimeter is about 200 mr. for full scale reading on a standard electrometer.

The above dosimeter may be calibrated in a known radiation field to provide the correlation necessary between chamber voltage and dose received. In order to obtain a liquid beta source without a wall to surround the dosimeter, a solution of a beta-emitting radioisotope is placed in a small dish and rotated about its vertical axis forming a paraboloidal cavity into which the dosimeter is inserted. Radiation then strikes the dosimeter from every direction with a $2\pi$ solid angle, without wetting or contaminating the dosimeter. The dosimeter may be inserted in the cavity for measured lengths of time to get the percent of the true beta dose that a given dosimeter reads when it is irradiated with the absorbed spectrum from a given radioisotope.

The dosimeter described above is very light in weight, is fairly rugged, is convenient to carry, is not discharged by mechanical shock, may be accurately calibrated and is relatively inexpensive to make.

Thus it will be appreciated by those versed in the art that we have provided a reasonably strong, yet small and lightweight personnel dosimeter which can be worn on a worker's wrist without hindering the work of the wearer, and which is responsive to dangerous ionizing radiations of both beta and gamma types from all directions within a hemisphere. The dosimeter while strong enough for field use, will allow the relatively weak beta rays to enter the ionization chamber and provide a measurement of the dose to human tissue which results from the exposure to the incident radiation.

What is claimed is:

1. A dosimeter sensitive to both gamma and soft beta radiation comprising a flat circular metallic shell provided with a thin cylindrical externally threaded upstanding flange adjacent to the outer edge thereof; a circular plate of insulating material fitting inside of said flange and affixed to said metallic shell, said plate being provided on its side opposite said shell with an annular groove adjacent to the outer edge to define an inner disc and an outer ring, said disc being coated with an electrically conducting material, said plate being further provided with an annular groove of selected size on its side adjacent to said shell, an annular ring of insulating material disposed in said last named annular groove; a cup-shaped cap with its top and sides being partially cut away to provide a known percentage of void area, said cap being screw fitted with the flange of said shell; a thin electrically conducting cup-shaped liner fitted inside of said cap, the lower edge of said liner contacting the flange of said shell when said cap is fitted to said shell, the thickness of said liner being substantially 7 milligrams per square centimeter, said coated disc and said liner defining an ionization chamber of a selected volume, means connected to said disc for placing an electrical charge thereon, said coated disc being insulated and spaced from said liner; and a base of insulating material threadably fitted to said cap to prevent accidental discharge of said disc, the dose received by said dosimeter being receivable from all directions within a hemisphere, and the dose actually received being at most the gamma dose plus the beta dose indicated by discharge of said dosimeter divided by said known percentage.

2. A dosimeter sensitive to both gamma and soft beta radiation and in the shape of a small pill box, comprising a metallic shell, a first electrically conducting flat electrode insulatingly supported on said shell, means connected to said first electrode for placing a charge thereon, a plastic cup-shaped cap, means for affixing said shell to and within said cap, said cap having its top and sides partially cut away to provide a known percentage of void area, a second electrode comprising an electrically conducting plastic liner fitted within said cap, the thickness of said liner being substantially 7 milligrams per square centimeter, said liner being grounded to said shell and mounted in spaced relation to said first electrode to define an ionization chamber and to maintain a potential impressed therebetween, and a plastic base threadably fitted to said cap, said base being provided with means for attachment of a wrist strap thereto, the dose received by said dosimeter being receivable from all directions within a hemisphere, and the dose actually received being at most the gamma dose plus the beta dose indicated by discharge of said dosimeter divided by said known percentage.

3. The dosimeter set forth in claim 2, wherein said shell is formed from aluminum or its alloys, and said cap is nylon.

4. The dosimeter set forth in claim 2, wherein said percentage of void area is substantially 50 percent.

5. A dosimeter sensitive to both gamma and soft beta radiation and in the shape of a small pill box which may be worn on the wrist of a person, comprising a metallic shell; a first electrically conducting electrode comprising a plastic disc having a coating of an electrically conducting material disposed thereon, means connected to said disc for placing a charge thereon, means for affixing said disc on its side opposite to its coated side to said shell; a plastic cup-shaped cap, means for affixing said shell to and within said cap, said cap having its top and sides partially cut away to provide a known percentage of void area; a second electrode comprising a plastic cup-shaped liner fitted within said cap and having a coating of an electrically conducting material disposed on the inside of said liner, the total thickness of said liner and its coating being substantially 7 milligrams per square centimeter, said second electrode being grounded to said shell and mounted in spaced relation to said first electrode to define an ionization chamber and to maintain a potential impressed therebetween, and a plastic base threadably fitted to said cap, said base being provided with means for attachment of a wrist strap thereto, the dose received by said dosimeter being receivable from all directions within a hemisphere, and the dose actually received being at most the gamma dose plus the beta dose indicated by discharge of said dosimeter divided by said known percentage.

References Cited in the file of this patent

UNITED STATES PATENTS

| | | |
|---|---|---|
| 2,536,991 | Wollan et al. | Jan. 2, 1951 |
| 2,587,254 | Victoreen | Feb. 26, 1952 |
| 2,596,080 | Raper et al. | May 6, 1952 |
| 2,730,625 | Shurcliff | Jan. 10, 1956 |
| 2,875,343 | Birkhoff | Feb. 24, 1959 |

UNITED STATES PATENT OFFICE
CERTIFICATE OF CORRECTION

Patent No. 2,968,731 January 17, 1961

Doyle M. Davis et al.

It is hereby certified that error appears in the above numbered patent requiring correction and that the said Letters Patent should read as corrected below.

Column 3, line 56, for "direction with" read -- direction within --.

Signed and sealed this 10th day of October 1961.

(SEAL)
Attest:

ERNEST W. SWIDER
Attesting Officer

DAVID L. LADD
Commissioner of Patents

USCOMM-DC